UNITED STATES PATENT OFFICE.

WILLIAM T. BAUSMITH, OF BALTIMORE, MARYLAND.

IMPROVEMENT IN COMPOUNDS FOR CRUCIBLES, FURNACE-LININGS, &c.

Specification forming part of Letters Patent No. 149,708, dated April 14, 1874; application filed March 24, 1874.

*To all whom it may concern:*

Be it known that I, WM. T. BAUSMITH, of the city of Baltimore and in the State of Maryland, have invented a certain new and useful Mixture for Crucibles and Furnace-Linings, also for Stove-Bricks; and do hereby declare that the following is a full, clear, and exact description thereof.

The nature of my invention consists in a composition of pulverized soapstone, plumbago, coal-ashes, and fuller's-earth, to be used for furnace-linings, stove-bricks, crucibles, and other similar purposes, as will be hereinafter more fully set forth.

The composition is mixed substantially in the following proportions: Forty parts of pulverized soapstone, twenty parts of plumbago, twenty parts of coal-ashes, and twenty parts of fuller's-earth.

These ingredients are all mixed thoroughly with water to the consistency of mortar, when it may be molded into any shape desired, such as for fire-bricks or other similar purposes. When to be used as furnace-linings or crucibles, a wooden structure is made of nearly the size of the inside of the furnace or the crucible desired, and the composition poured around the same, and when perfectly dry the wood is easily burned out.

I do not confine myself to any particular method of applying this composition, or of forming the articles desired to be made. Neither do I confine myself to the precise proportions of the ingredients mentioned, as they may be varied according to the uses to which the articles to be made are to be put.

Having thus fully described my invention, what I claim as new, and desire to secure by Letters Patent, is—

The composition herein described, consisting of pulverized soapstone, plumbago, coal-ashes, and fuller's-earth, substantially as and for the purposes herein set forth.

In testimony that I claim the foregoing I have hereunto set my hand this 13th day of March, 1874.

WILLIAM THOS. BAUSMITH.

Witnesses:
 NICHOLAS TURNER,
 JNO. T. MADDOX.